United States Patent
Willodson (10) Patent No.: US 11,091,084 B2
(45) Date of Patent: *Aug. 17, 2021

(54) HAND-DRIVEN RATCHET STRAP ASSIST DEVICE

(71) Applicant: Sarah Mason Scott, Mankato, MN (US)

(72) Inventor: Bradley Jay Willodson, Mankato, MN (US)

(73) Assignee: Sarah Mason Scott, Mankato, MN (US)

(*) Notice: Subject to any disclaimer, the term of this patent is extended or adjusted under 35 U.S.C. 154(b) by 119 days.

This patent is subject to a terminal disclaimer.

(21) Appl. No.: 16/592,435

(22) Filed: Oct. 3, 2019

(65) Prior Publication Data

US 2020/0039418 A1 Feb. 6, 2020

Related U.S. Application Data

(63) Continuation of application No. 16/515,893, filed on Jul. 18, 2019, now Pat. No. 10,625,657, which is a continuation of application No. 15/586,012, filed on May 3, 2017, now Pat. No. 10,414,323.

(60) Provisional application No. 62/495,437, filed on Sep. 14, 2016.

(51) Int. Cl.
*B60P 7/08* (2006.01)

(52) U.S. Cl.
CPC ............ *B60P 7/0823* (2013.01); *B60P 7/083* (2013.01); *B60P 7/0846* (2013.01); *Y10T 24/21* (2015.01); *Y10T 24/2175* (2015.01)

(58) Field of Classification Search
CPC ....... B60P 7/0823; B60P 7/083; B60P 7/0846; Y10T 24/21; Y10T 24/2175
See application file for complete search history.

(56) References Cited

U.S. PATENT DOCUMENTS

| | | | | |
|---|---|---|---|---|
| 5,423,644 A * | 6/1995 | First, Sr. | ................ | A44B 11/14 24/68 CD |
| 8,360,202 B1 * | 1/2013 | Woodard | ................. | A62B 1/16 182/3 |
| 9,796,323 B1 * | 10/2017 | Anderson | ............... | B60P 7/083 |
| 9,862,300 B1 * | 1/2018 | Anderson | ........... | B65H 75/4494 |
| 10,414,323 B2 * | 9/2019 | Willodson | .............. | B60P 7/083 |

(Continued)

*Primary Examiner* — Michael E Gallion
(74) *Attorney, Agent, or Firm* — Craige Thompson; Thompson Patent Law (57) ABSTRACT

Apparatus and associated methods relate to a ratchet strap system configured with a ball-shaped handgrip adapted to manipulate a ratchet strap drive shaft. In an illustrative example, the handgrip may include a substantially spherical distal portion coupled to the drive shaft via a substantially cylindrical neck member. The handgrip may, for example, be configured for after-market installation by receiving a shaft extension member of the drive shaft. Some handgrips may include opposing radial apertures for a retention pin to longitudinally fix the handgrip to the shaft extension member. A pliable resilient member disposed at the distal end may prevent decoupling prior to tensioning the strap. In various embodiments, the deployment time of a ratchet strap system may, for example, be reduced by using the handgrip to facilitate initial winding of a load securing strap, and to wind excess strap length for storage in conjunction with an elastic retaining loop.

18 Claims, 9 Drawing Sheets

(56) References Cited

U.S. PATENT DOCUMENTS

| | | | | |
|---|---|---|---|---|
| 10,486,582 B1* | 11/2019 | Hamm | ................... | B60P 7/0846 |
| 10,625,657 B2* | 4/2020 | Willodson | .............. | B60P 7/083 |
| 2003/0093884 A1* | 5/2003 | Doty | ........................ | B60P 7/13 |
| | | | | 24/302 |
| 2009/0025185 A1* | 1/2009 | Banes | ................... | B65D 63/18 |
| | | | | 24/3.1 |
| 2009/0100653 A1* | 4/2009 | Wang | ..................... | B60P 7/083 |
| | | | | 24/68 CD |
| 2009/0241307 A1* | 10/2009 | Ayers | ................... | B60P 7/0869 |
| | | | | 24/68 CD |
| 2009/0283729 A1* | 11/2009 | Carlson | ................... | B60P 7/083 |
| | | | | 254/218 |
| 2010/0025645 A1* | 2/2010 | Carlson | ................ | B60P 7/0846 |
| | | | | 254/218 |
| 2010/0071174 A1* | 3/2010 | Adcock | ................... | B60P 7/083 |
| | | | | 24/68 CD |
| 2010/0175233 A1* | 7/2010 | Breeden | ................ | B60P 7/0846 |
| | | | | 24/68 CD |
| 2013/0031755 A1* | 2/2013 | Huang | ................... | B60P 7/083 |
| | | | | 24/68 CD |
| 2013/0291353 A1* | 11/2013 | Lu | ......................... | B60P 7/0846 |
| | | | | 24/68 E |
| 2015/0117975 A1* | 4/2015 | Wright | ................. | B60P 7/0869 |
| | | | | 410/103 |
| 2015/0224912 A1* | 8/2015 | Brown | ................... | B60P 7/083 |
| | | | | 242/395 |
| 2018/0072216 A1* | 3/2018 | Willodson | .............. | B60P 7/083 |
| 2018/0339637 A1* | 11/2018 | Hatcher | ................. | B60P 7/083 |

* cited by examiner

HAND-DRIVEN RATCHET STRAP ASSIST DEVICE

CROSS-REFERENCE TO RELATED APPLICATIONS

This application claims the benefit and is a continuation of U.S. patent application Ser. No. 16/515,893 entitled "Hand-Driven Ratchet Strap Assist Device," filed by Bradley Jay Willodson on Jul. 18, 2019, which claims the benefit of U.S. patent application Ser. No. 15/586,012 entitled "Hand-Driven Ratchet Strap Assist Device," filed by Bradley Jay Willodson on May 3, 2017, now, U.S. Pat. No. 10,414,323, which claims the benefit of U.S. Provisional Application No. 62/495,437 entitled "Hand-driven assist device for ratchet strap drive mechanism," filed by Bradley Jay Willodson on Sep. 14, 2016.

This application incorporates the entire contents of the foregoing application(s) herein by reference.

TECHNICAL FIELD

Various embodiments relate generally to ratchet straps.

BACKGROUND

Ratchet straps are tie-down straps that may be tensioned by a ratchet. Some ratchet straps secure cargo or loads. Ratchet straps may be used to secure loads during transport. Securing heavy loads during transport may require a strap or webbing that is very tight. In some scenarios, the webbing or strap tension in a ratchet strap may be very high. Some ratchet straps may have a strap tension release mechanism. Such a ratchet strap tension release mechanism may be activated by a user to release strap tension securing a load.

Strap tension in some ratchet straps may be adjusted by a ratchet mechanism. Ratchet straps can use a ratchet mechanism to tension a strap anchored at two points. In operation, ratchet straps may wind or spool the strap around an axle to tension the strap.

SUMMARY

Apparatus and associated methods relate to a ratchet strap system configured with a ball-shaped handgrip adapted to manipulate a ratchet strap drive shaft. In an illustrative example, the handgrip may include a substantially spherical distal portion coupled to the drive shaft via a substantially cylindrical neck member. The handgrip may, for example, be configured for after-market installation by receiving a shaft extension member of the drive shaft. Some handgrips may include opposing radial apertures for a retention pin to longitudinally fix the handgrip to the shaft extension member. A pliable resilient member disposed at the distal end may prevent decoupling prior to tensioning the strap or webbing. In various embodiments, the deployment time of a ratchet strap system may, for example, be reduced by using the handgrip to facilitate initial winding of a load securing strap, and to wind excess strap length for storage in conjunction with an elastic retaining loop.

Various embodiments may achieve one or more advantages. For example, some embodiments may improve ratchet strap jam-clearing safety and efficiency. This facilitation may be a result of a user operating a knob rigidly coupled to the ratchet axle and configured to fit a human hand, for example, to clear a jammed ratchet strap by rotating the knob to back the strap out of the axle. In some embodiments, a multipurpose rotatable handgrip coupled to the rotating axle of a ratchet mechanism may aid users in clearing a strap jam by facilitating the backing-out (unwinding) of the strap without the employment of tools or potentially hazardous physical force. Further, users may hold the ratchet mechanism with one hand while the other hand turns the multipurpose rotatable handgrip to unwind the strap.

Some embodiments may improve user safety. For example, a jammed strap may be cleared by turning the multipurpose rotatable handgrip to unwind the strap. The multipurpose rotatable handgrip may enable a user to apply adequate torque to allow rotation of the spooled-up strapping, thereby releasing the strapping from the ratchet mechanism. In some examples, as a user is releasing the ratchet tie-down system, the user may grip the multipurpose rotatable handgrip and release the load in a controlled manner. The controlled release may safely mitigate a rebounding load, and may prevent damage to unbalanced loads. In some embodiments, the multipurpose rotatable handgrip may be referred to as a knob.

Various implementations may provide improved control to an operator releasing tension from a strap. Such improved control may be a result of providing continuously variable strap tension by manually rotating the knob.

In some examples, an operator may find benefit with the ratchet strap configured with a knob, by using the knob to index the slot in the axle to a position where the load securing strap may be conveniently fed directly through and orthogonal to the mechanism instead of feeding longitudinally into the mechanism, e.g., which may be an awkward angle.

In some embodiments, the user effort to secure a ratchet strap may be reduced. For example, an operator securing a ratchet strap may avoid the dislodgment of a rigid hook on one strap end by temporarily securing the rigid hook on that strap end facilitated with a bendable companion hook coupled to the rigid hook. The bendable companion hook may support the weight of, and stabilize the position of, the rigid hook. Further, the stabilization of the rigid hook may advantageously act as a second pair of hands while the operator is remotely securing a second rigid hook at the opposite end of the ratchet tie-down system, and while the operator is managing the ratchet mechanism.

In some scenarios, securing a load may not require the entire strap length of a ratchet strap. The resulting excess ratchet strap length may present a hazard to life or property in various scenarios. In such examples, excess strap length may be bundled and retained around the knob. Such hazard reduction may releasably retain an otherwise free strap end in a bundle coiled around the knob when the ratchet strap is in use. In an illustrative example, the in-transit stowage of the excess ratchet strap length may prevent entanglement with nearby objects. Further, the controlled wrapping of the in-transit stowage of the excess ratchet strap length may reduce a user's effort in untangling and or untying the strap after use. In some examples, the in-transit stowage of the excess ratchet strap length may avoid hazards (e.g., tripping, striking) to those nearby.

In various examples, owners may find advantage in the cache stowage feature of the ratchet tie-down system where the straps may be wound around the ratchet mechanism and retained in place by the elastic loop. In some embodiments, the ratchet tie-down system may facilitate self-cached stowage, e.g., to prevent entanglement with co-located ratchet tie-down systems. Further user's may find a time benefit in removing a ratchet tie-down system in a self-cached state, and, for example, hassle-free deployment without having to untangle the straps.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, exemplary use case scenarios of an exemplary ratchet strap configured with a knob adapted to be gripped by a human hand to adjust the strap tension are briefly introduced with reference to FIGS. 1A, 1B, 1C and 1D. Second, with reference to FIGS. 2A and 2B, the discussion turns to exemplary embodiments that illustrate design of an exemplary ratchet strap. Then, with reference to FIGS. 3A, 3B, 3C and 3D, the design of a multipurpose rotatable handgrip is described. Next, in FIG. 4, an exemplary ratchet strap embodiment is presented. Finally, with reference to FIGS. 5 and 6, various embodiments of a companion hook are presented.

Figure 1A:
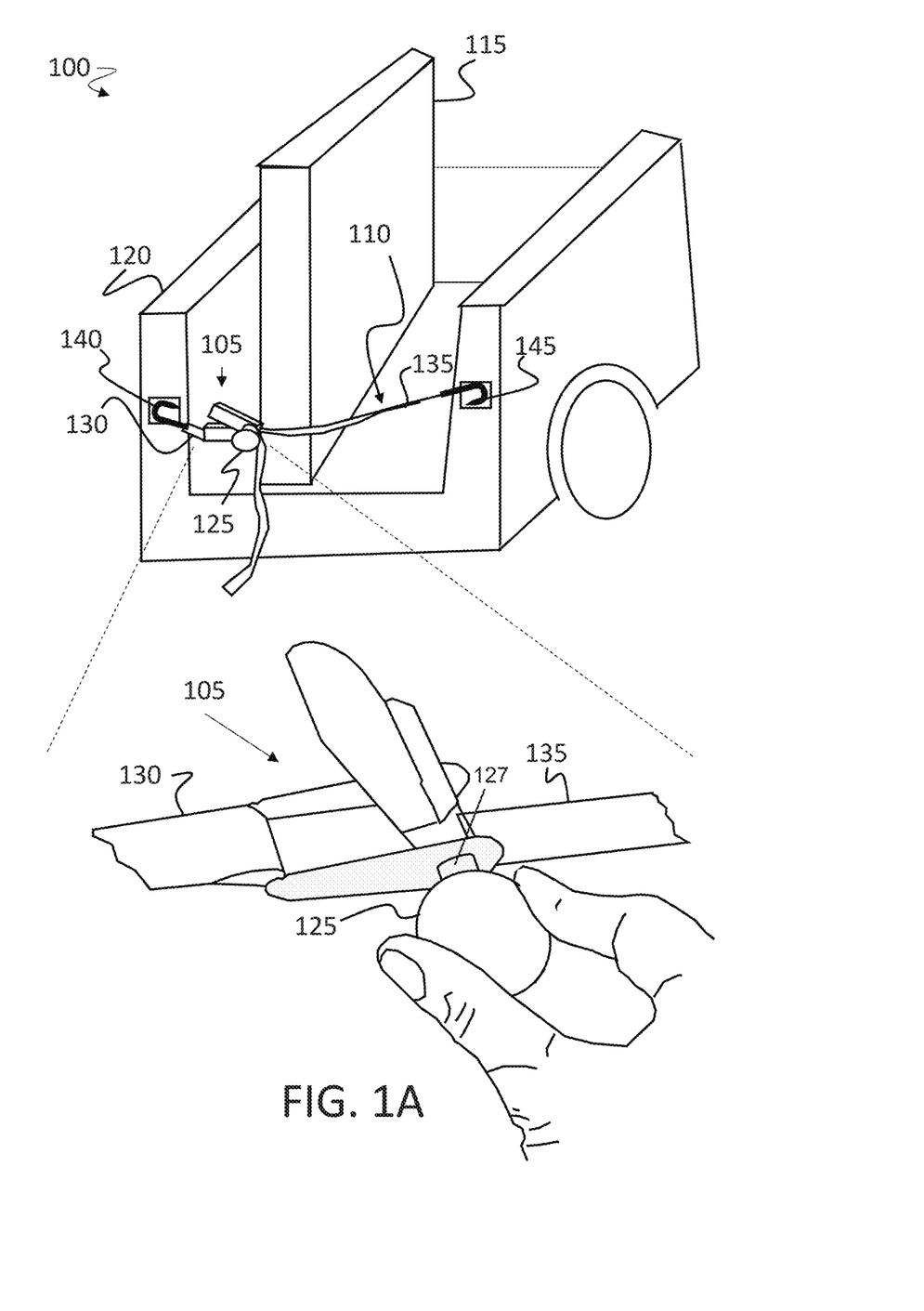
FIG. 1A depicts a use case scenario of an exemplary ratchet tie-down system.

FIG. 1A depicts a use case scenario of an exemplary ratchet tie-down system. A use case scenario 100 includes a ratchet mechanism 105 in a ratchet tie-down system 110. The ratchet tie-down system 110 secures a load 115 in a vehicle 120. The ratchet mechanism 105 includes a multipurpose rotatable handgrip 125 that is operably coupled to a drive shaft of the ratchet mechanism 105 through neck portion 127. The ratchet mechanism 105 is fixed at a proximal end to a strap 130 and at a distal end to a strap 135. In operation, the ratchet mechanism 105 rotates the drive shaft to spool the strap 130 so as to provide tension on the system 110. When tensioned, the system 110 extends between a proximal securing hook 140 coupled to a proximal end of the strap 130, and a distal securing hook 145 coupled to a distal end of the strap 135. In the depicted example, an operator may advantageously actuate the handgrip 125 to manipulate the drive shaft in order to, for example, load, tension, detension, or clear jams of the strap 135.

In the depicted figure, the proximal securing hook 140 engages a left-side aperture on the vehicle 120, and the distal securing hook 145 engages a right-side aperture on the vehicle 120. The ratchet mechanism 105 is linkably coupled to the proximal strap 130, and the proximal strap 130 is linkably coupled to the proximal hook 140. The ratchet mechanism 105 is removably and bindably coupled to the strap 135 in a spooling relationship. The distal strap 135 is linkably coupled to the distal securing hook 145.

During initial deployment of the ratchet tie-down system 110, pre-tension may be applied by feeding a proximal end of the distal strap 135 through an aperture in the drive shaft (as described in further detail with reference to FIG. 4), pulling the threaded end through to remove most of the slack, and pretensioning the system 110 by rotating the multipurpose rotatable handgrip 125 with the operator's hand. The pre-tensioning operation removes additional slack and begins to make the straps 130 and 135 taught and urges the hooks 140 and 145 to engage their respective attachment points. Final tension is achieved by operating the ratchet mechanism 105, which includes hinging the mechanism open and closed repeatedly to spool up the strap 135 as tension increases to a desired level.

In various implementations, the multipurpose rotatable handgrip 125 may be adapted to be securely gripped in a hand of a user. In some embodiments, at least a portion of the multipurpose rotatable handgrip 125 may be substantially elliptical in shape. In some designs, at least a portion of the multipurpose rotatable handgrip 125 may be substantially spherical in shape. In various implementations, the multipurpose rotatable handgrip 125 may include one or more grip features. In some embodiments, a grip feature of the multipurpose rotatable handgrip 125 may include longitudinal raised ridges and/or scalloped trenches, which may, for example, improve traction for a secure grip when handled by the user. In some embodiments, a grip feature of the multipurpose rotatable handgrip 125 may include knurling.

Figure 1B:
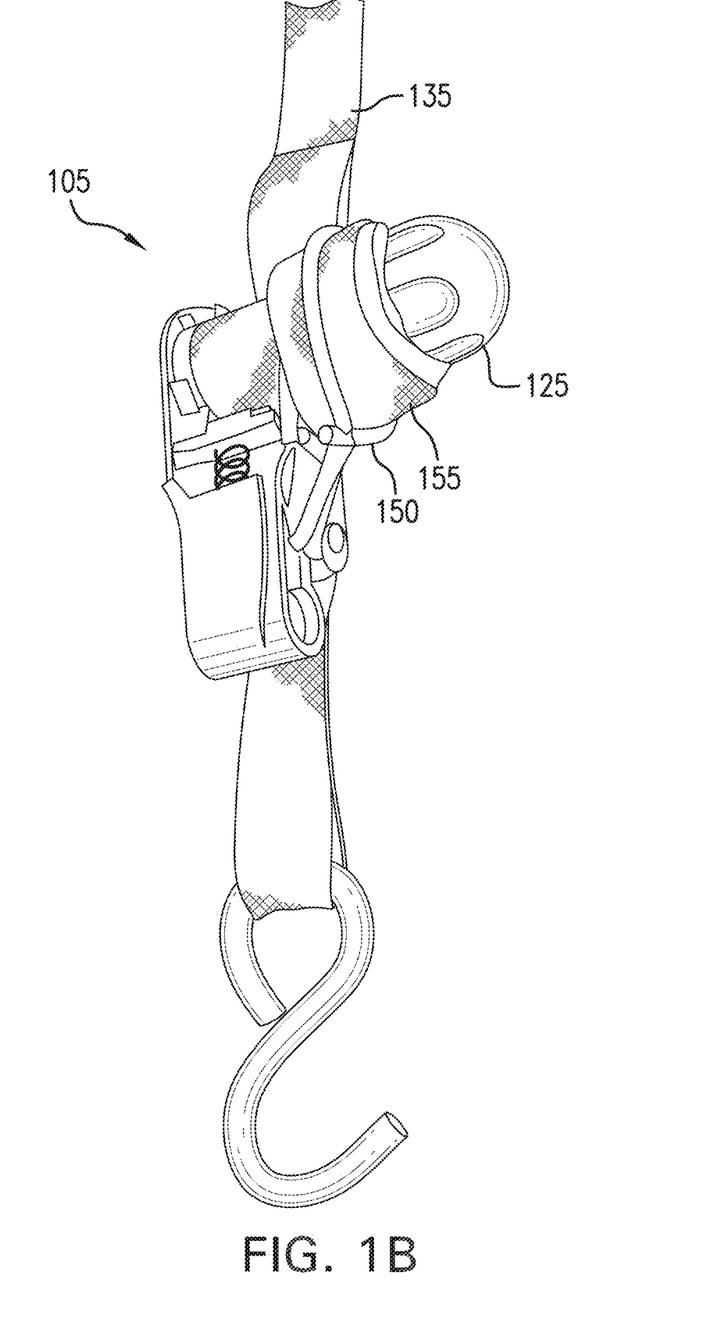
FIG. 1B depicts a perspective view of an exemplary ratchet mechanism in an in-transit stowed state.

FIG. 1B depicts a perspective view of an exemplary ratchet mechanism in an in-transit stowed state. The ratchet mechanism 105 includes the multipurpose rotatable handgrip 125 and an elastic loop 150. In the depicted figure, a proximal tail of the elastic loop 150 may be secured by a knot on an interior side of a wall of the ratchet mechanism 105, the tail extending through an aperture in the wall to a loop portion of the elastic loop 150. The elastic loop 150 retains an excess length of the proximal end of the strap 135 that is coiled around the multipurpose rotatable handgrip 125.

In operation, a user may coil an excess ratchet strap length 155 around the multipurpose rotatable handgrip 125. The user may then employ the elastic loop 150, which may be sized to stretch around the coil of excess ratchet strap length 155. Employment of the elastic loop 150 may advantageously organize and manage an otherwise loose length of webbing. In some examples, in-transit stowage of the excess ratchet strap length may avoid entanglements and/or hazards (e.g., tripping, striking) to those nearby.

Figure 1C:
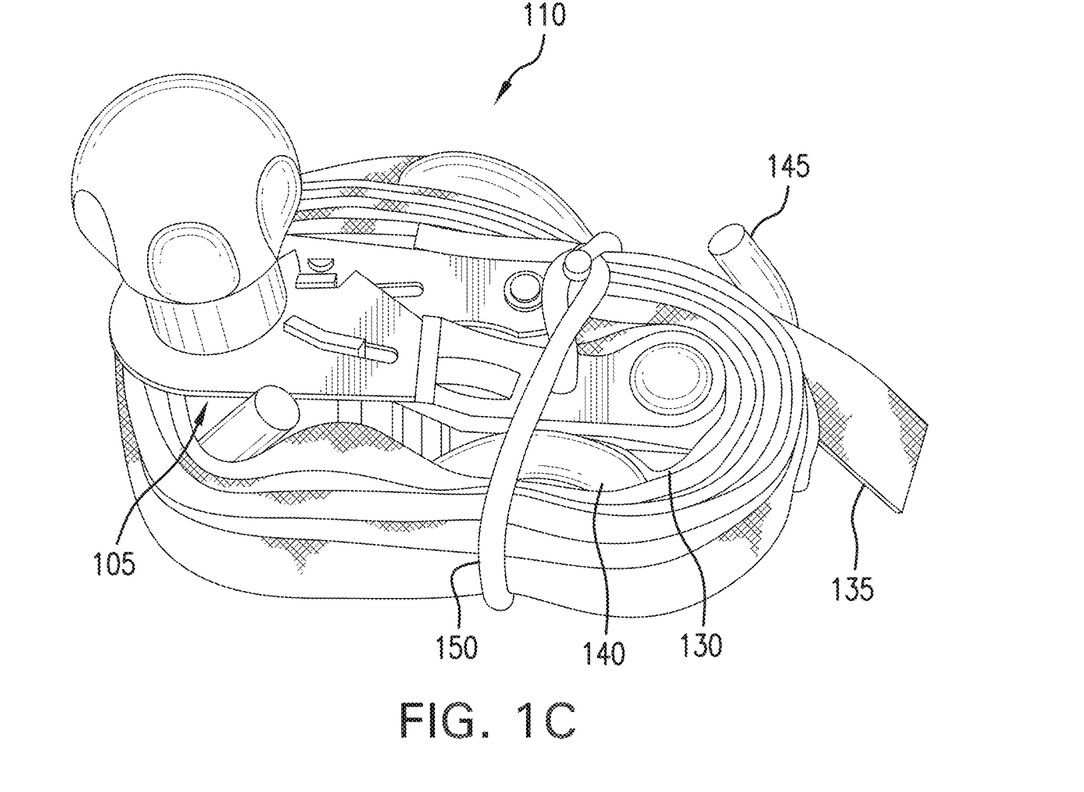
FIG. 1C depicts an exemplary ratchet tie-down system in a cached stowage state.

FIG. 1C depicts an exemplary ratchet tie-down system in a cached stowage state. The ratchet tie-down system 110 includes the ratchet mechanism 105 with the straps 130, 135. In the depicted example, the straps 130, 135 are coiled around the ratchet mechanism 105 to create a bundle suitable, for example, for convenient stowage. To retain the straps 130, 135 to the ratchet mechanism 105 in the bundled state, the elastic loop 150 encircles the coiled straps and their respective hooks 140, 145. The elastic loop 150 may be sized to stretch around the ratchet tie-down system 110 in the bundled state.

Figure 1D:
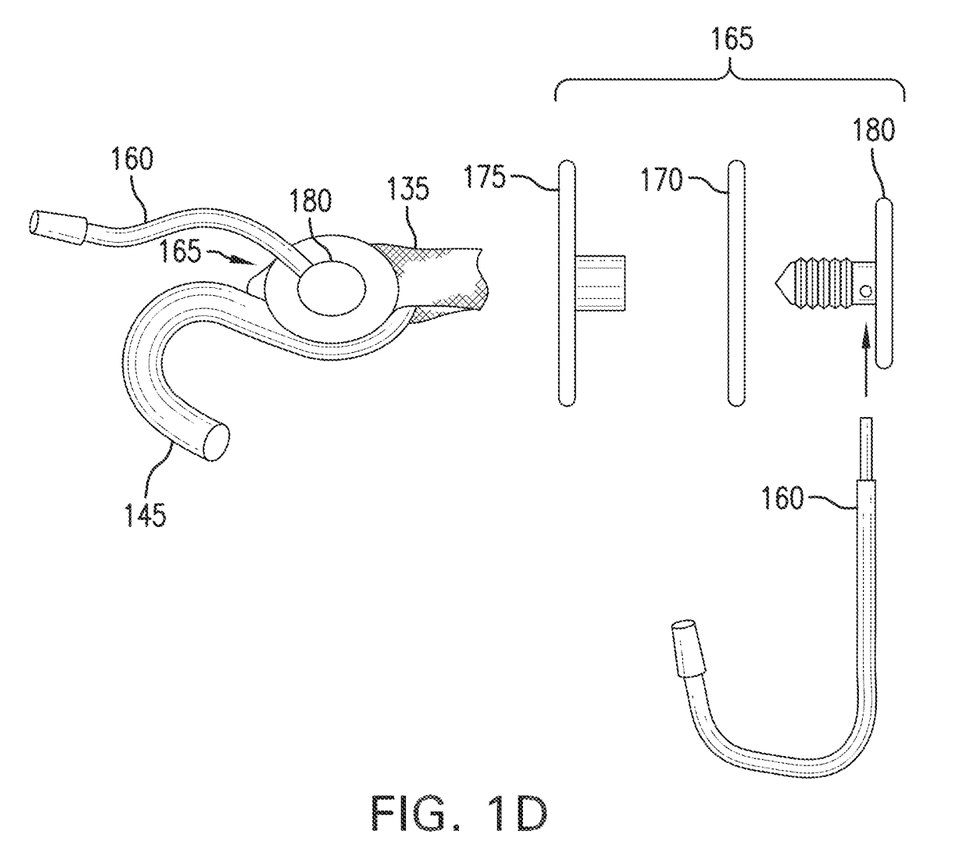
FIG. 1D depicts an exemplary companion hook.

FIG. 1D depicts an exemplary companion hook. The distal hook 145 is coupled to a flexible companion hook 160. The flexible companion hook 160 may be a longitudinally stiff, compliant, radially deformable, shape-resilient filament that may substantially retain its shape until at least a predetermined minimum radial deformation force is applied to a point or a segment along its length. In an illustrative example, the flexible companion hook 160 may aid a user in deploying the strap 135. The flexible companion hook 160 may be advantageously bent around or wrapped around a nearby structure to the distal securing hook 145, holding the distal securing hook 145 in place, until tension is applied by operation of the ratchet mechanism (FIG. 1A reference 105).

In some examples, the flexible companion hook 160 may complement the distal securing hook 145 to, at least temporarily, bridge the gap in the hook to form an enclosed ring structure. In some examples, the hook 160 may be deformed to prevent the distal hook 145 from disengaging from a target location while the distal strap 135 is slack.

In some examples, the hook 160 may be deformed to, in effect, close the open end of the hook 145, which may be sufficient to keep the distal hook 145 from falling off a securing point until slack is removed from the strap 135. In some implementations, the companion hook 160 may wrap around a nearby feature of the securing point or attachment structure, such as vehicle 120, and may advantageously hold the distal hook 145 in a position suitable for engaging the securing point, while a user manages the proximal side of the ratchet tie-down system at a remote distance from the distal hook 145. In some implementations, the flexible companion hook 160 may advantageously provide increased attaching agility in space-constrained recesses, relative to the distal hook 145.

In the depicted embodiment, the flexible companion hook 160 is fixedly coupled to the distal hook 145 by a flexible companion hook retaining system 165. In the depicted embodiment, the flexible companion hook retaining system 165 includes a flat washer 170. The flat washer 170 is rivetably engaged by a rivet cap 175 and a rivet post 180. The flexible companion hook retaining system 165 is retained substantially within an eyelet in the distal hook 145, and secures the flexible companion hook 160 within an aperture in the rivet post 180.

In some embodiments, the companion hook 160 may attach to the distal hook 145 and/or the strap 135 without the washer 170. Some embodiments may include the flexible companion hook 160 being fixedly coupled to the distal hook 145, such as by rubber encapsulating, welding and/or by end-wrapping.

In some embodiments, the flexible companion hook 160 may be adapted to swivel about a coupling point (e.g., rivet). For example, the flexible companion hook 160 may be secured to an aperture on the distal end of the rivet post 180, after the rivet post 180, the washer 170 and the rivet cap 175 have been rivetably engaged. Further the rivet engagement may be substantially loose to allow the flexible companion hook 160 to swivel about the axis of the rivet post 180.

The proximal end of the flexible companion hook 160 may be fixedly coupled to, for example, an eyelet. Some examples of the flexible companion hook retaining system 165 may couple more than one flexible companion hook 160 for coupling the flexible companion hook 160 to a target load. In some embodiments, the flexible companion hook 160 may be integrally formed with the distal hook 145 without the need for washers.

In an illustrative example, a construction worker may desire to transport a drywall load. The construction worker may choose a ratchet tie-down system 110 which may be pre-bundled as shown in FIG. 1C. Since the elastic loop 150 had stayed with the ratchet tie-down system 110 from a previous load hauling job, the previous construction worker conveniently gathered the ratchet tie-down system 110 in a neat bundle. The current construction worker may now unbundle the ratchet tie-down system by removing the elastic loop 150 and unbundling the strap 135. The construction worker may now couple the distal hook 145 to an anchor point on his vehicle 120. The construction worker employs the flexible companion hook 160, advantageously wrapping it around the anchor point on his vehicle 120. With the help of the flexible companion hook 160, the construction worker may quickly place the load securing strap 135 over his drywall load without concern that the distal hook 145 may fall out of the anchor point. The construction worker places the proximal hook 140 into an anchor point on the opposite side of his vehicle 120, while he pulls the tail-end of the load securing strap 135 into the ratchet mechanism 105. The construction worker indexes the ratchet mechanism 105 by turning the multipurpose rotatable handgrip 125 to a position that provides a convenient entry and exit of the proximal end of the load securing strap 135. The construction worker now pulls the excess strap 135 through the ratchet mechanism 105, places his thumb on the strap drive mechanism, and rotates the handgrip 125 until a few turns of the load securing strap 135 are in an initial spooling or binding relationship around the strap-drive mechanism. In a brief period of time, the construction worker has deployed the ratchet tie-down system 110 to the point of incipient final tensioning of the strap. The construction worker now operates the ratchet mechanism 105, by opening and closing once, twice, or more times to tighten the strap 135 to a desired degree of tautness. As the construction worker is tightening the strap 135 he may experience a jam. The worker may now hold on to the ratchet mechanism 105 by the handgrip 125, lift the pawl, and let out a controlled amount of strap length until the jam is unspooled, thereby clearing the jam. The worker may now proceed with the strap tightening operation. The worker finalizes the ratchet tie-down system deployment by wrapping the excess strap length 155 around the multipurpose rotatable handgrip 125, then retains the strap wrapping with the elastic loop 150. The convenience of the co-located elastic loop 150 and multipurpose rotatable handgrip 125 allows the construction worker to quickly and safely stow the excess strap length 155 while the ratchet tie-down system 110 is in use under tension.

Continuing the foregoing illustrative example, when the construction worker reaches a destination site, he removes the elastic loop from the excess strap length 155. The excess strap length uncoils from the handgrip 125 and falls into a neat pile. The construction worker now grabs the ratchet mechanism 105 by the handgrip 125, lifts the pawl, and slowly releases the tension in the strap 135. As he releases the tension, he may notice a slight load shift. The worker tightens his grip on the handgrip 125 and re-deploys the pawl to stop advancing the strap 135. The worker now checks his load for balance, correcting any issues, then returns to the ratchet mechanism 105, where he continues the tension release until the strap 135 is completely released from the load. The construction worker now removes the ratchet tie-down system 110 from his vehicle and wraps the strap 135 around the ratchet mechanism 105. Once completely wrapped, the worker deploys the elastic loop 150, to retain the bundle. The worker now neatly stows the ratchet tie-down system 110 for the next job.

Figure 2A:
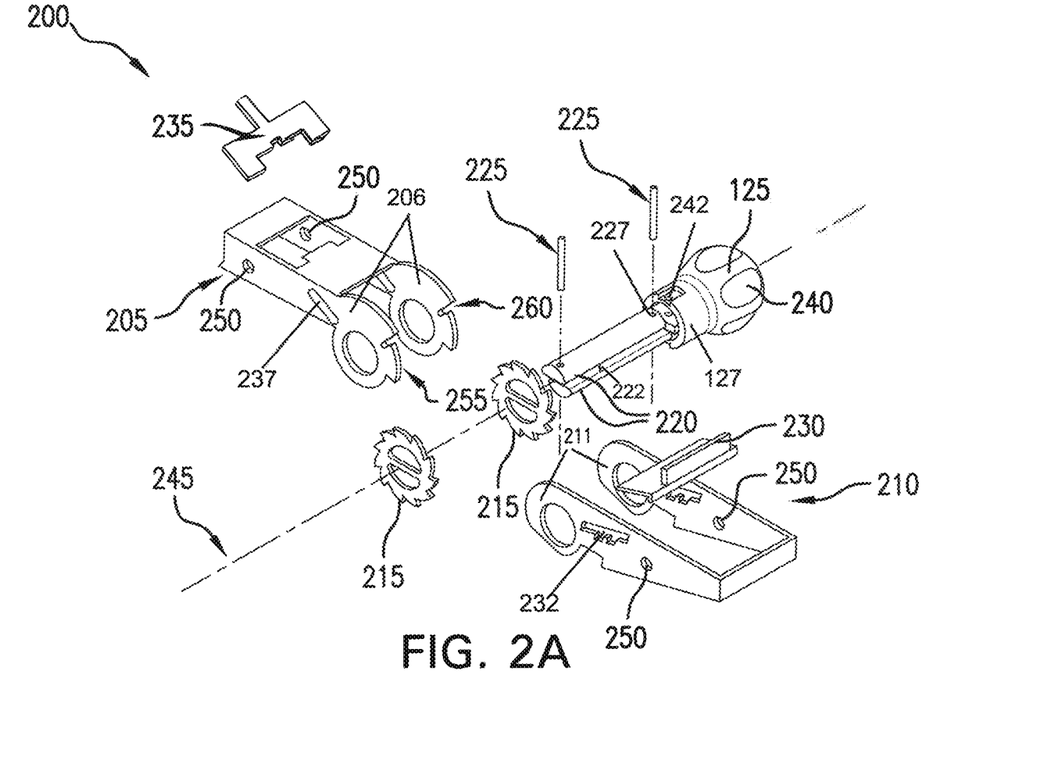
FIG. 2A depicts an exploded perspective view of a ratchet mechanism with an exemplary multipurpose rotatable handgrip.

FIG. 2A depicts an exploded perspective view of a ratchet module or ratchet mechanism with an exemplary multipurpose rotatable handgrip. A ratchet mechanism 200 includes a first base structure that is hook retaining structure 205 that hingedly couples with a second base structure depicted by ratchet handle retaining structure 210. The hook retaining structure 205 and the ratchet handle retaining structure 210 are in hinged relationship about a ratchet axle 220. The ratchet axle 220 is slideably engaged within the circular apertures on both the hook retaining structure 205 and the ratchet handle retaining structure 210. The ratchet axle 220 is slidably engaged with a pair of ratchet gears 215. The two ratchet gears 215 include a crossmember through the centers, slidably engage with the longitudinal slot defined between to extension members of the ratchet axle 220. In operation, rotation of the ratchet axle 220 rotates the ratchet gears 215. In some modes of operation, the ratchet gears 215 rotate in both directions about an axis normal to the plane of the ratchet gears 215, in response to rotations of the ratchet axle 220. In the illustrated embodiment, a pair of cotter pins 225 laterally secure or couple the ratchet gears 215, the hook retaining structure 205, and the ratchet handle retaining structure 210, to the ratchet axle 220.

One of the pair of cotter pins 225 also couples the multipurpose rotatable handgrip 125 to the ratchet axle 220 through a pair of apertures 242 on opposing sides of the neck portion 127 and corresponding apertures 227 on ratchet axle 220. In some implementations, one or both ends of the cotter pins 225 may be bent, such as with a pliers or other suitable tool, so as to retain or remove each one of the cotter pins 225 from the ratchet axle 220.

In the depicted example, the ratchet gears 215 include ratchet teeth radially extending from the perimeter of each of the ratchet gears 215. A ratchet tension release bar 230 is slideably retained by the ratchet handle retaining structure 210, and is in a releasably blocking relationship with the ratchet teeth.

A ratchet pawl 235 is slideably retained in slot 237 by the hook retaining structure 205, and is in a releasably blocking relationship with the ratchet teeth.

In a first mode of operation that occurs over a first predetermined range of angles between the structures 205, 210, the axle 220 is rotated so as to spool the distal strap onto itself. In this first mode of operation, the ratchet pawl 235 and the ratchet tension release bar 230 dynamically engage with the ratchet gears 215, each biased by a respective spring member (not shown) so as to block rotation of the axle 220 in a first direction. By exercising the structure 210 open and closed, relative to the structure 205 within the first predetermined range of angles. The ratchet bar 230 imparts a rotation in a second direction (opposite the first direction) to the axle 220 as the ratchet bar 230 positively engages one of the teeth on one or both of the ratchet wheels 215. As the structure 210 is opened in this first mode of operation, the maximum open angle is limited by a radial step member 255 that defines an increase in radius of an annular ring portion 206 of the structure 205. As the structure 210 is closed in this first mode of operation, the minimum open angle, in some embodiments, is approached as the structures 205, 210 come into contact with each other.

To engage a second mode of operation, the ratchet bar 230 is pulled radially away from the ratchet wheel 215 to allow the ratchet bar 230 to ride on top of the radial step member 255 over a second predetermined angular range. The radius of the step member 255 is greater than the radius of the annular ring portion 206 of the structure 205 corresponding to the first predetermined range of angles. Being lifted radially away from engagement with the ratchet wheel 215, the ratchet bar 230 slidably engages the radial step member 255 through slot 232 over this second predetermined angular range. As such, in this second mode of operation, a user can use the multipurpose rotatable handgrip 125 to impart free rotation of the ratchet axle 220 in only the second direction, while rotation of the ratchet axle 220 is blocked by engagement of the ratchet teeth with the pawl 235. In this second mode of operation, the handgrip 125 may advantageously provide for a controlled leverage to rotate the axle 220 in only one orientation, i.e., the second direction.

To engage a third mode of operation, the ratchet bar 230 is translated to a notch 260 defined by a decreased radius forming a trailing edge of the radial step member 255, and an adjacent second step member that limits the angular travel of the ratchet bar 230. In this end-of-travel, or home, position, a cam portion of the annular ring portion 211 of the structure 210 radially displaces the pawl 235 such that neither the bar 230 nor the pawl 235 are able to engage the ratchet wheel 215. As such, in this third mode of operation, a user can use the multipurpose rotatable handgrip 125 to impart free rotation of the ratchet axle 220 in both the first and second directions as desired. In this third mode of operation, the handgrip 125 may advantageously provide for a controlled leverage, for example, to position the axle 220 to conveniently load or unload the strap, pretension or remove tension, or clear a jam of the distal strap.

To enhance leverage, the depicted exemplary multipurpose rotatable handgrip 125 includes a grip feature 240. In some embodiments, the multipurpose rotatable handgrip 125 may be referred to as a knob. The ratchet handle retaining structure 210 hingedly couples to the hook retaining structure 205, forming a hinge axis 245. The ratchet handle retaining structure 210 includes a retaining loop attachment aperture 250 for a retaining accessory such as, for example, the elastic loop 150 of FIG. 1C.

Figure 2B:
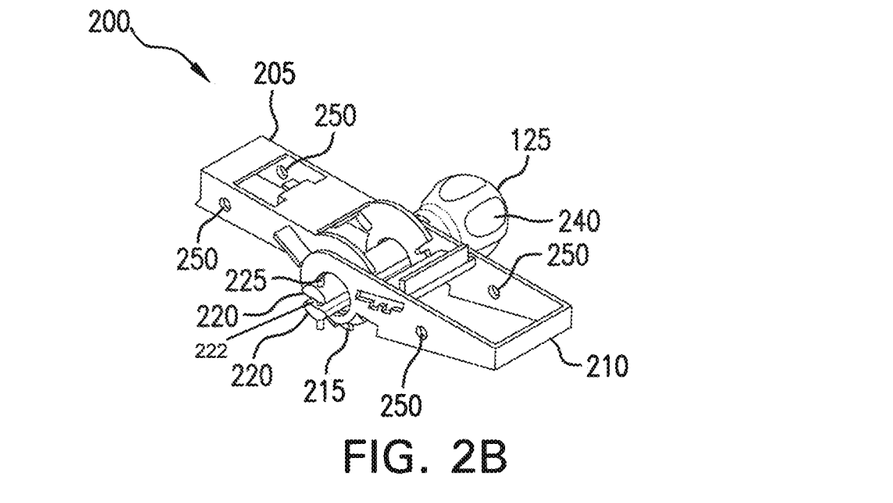
FIG. 2B depicts an assembled perspective view of a ratchet mechanism with an exemplary multipurpose rotatable handgrip.

FIG. 2B depicts an assembled perspective view of a ratchet mechanism with an exemplary multipurpose rotatable handgrip. The hook retaining structure 205 hingedly couples with the ratchet handle retaining structure 210. The hinging point includes the ratchet axle 220, holding the structures 205 and 210 in hinged relationship. The ratchet gears 215 along with the cotter pins 225 hold the ratchet axle 220 in place. The ratchet axle 220 may be a two-piece strap-drive that is held in place by the multipurpose rotatable handgrip 125 and the ratchet gears 215. The aperture or gap 222 between the two pieces of the strap-drive, or the ratchet axle 220, provides a slot for the strap to enter and wind around the ratchet axle 220. In some embodiments, the ratchet axle 220 may be a one-piece strap drive that is connected within the multipurpose rotatable handgrip 125.

The retaining loop attachment aperture 250 is depicted within both the hook retaining structure 205 and the ratchet handle retaining structure 210. In some embodiments, the aperture 250 may be located on one or more structures. One or more of the apertures 250 may be employed to hold one or more accessories (see, e.g., the elastic loop 150 of FIG. 1B). In some examples, one or more of the apertures 250 may be unused.

In various implementations, the multipurpose rotatable handgrip 125 may include one or more grip features. In some embodiments, the grip feature 240 of the multipurpose rotatable handgrip 125 may include longitudinal grooves. In some embodiments, a grip feature of the multipurpose rotatable handgrip 125 may include spiraled scalloped trenches, for example.

In some embodiments, the ratchet mechanism 200 may include a molded plastic handle molded around the distal end of the ratchet handle retraining structure 210. The molded plastic handle may be a softer and smoother material than the ratchet handle retaining structure 210, which may advantageously provide scratch resistance. In some examples, the molded plastic handle may provide increased user comfort during deployment.

In some embodiments, the multipurpose rotatable handgrip 125 may be advantageously adapted to receive a coiled strap. In some examples, the multipurpose rotatable handgrip 125 may include an elongated shaft adapted to receive substantially long coiled straps. In some examples, the multipurpose rotatable handgrip 125 may be sized to be gripped by typical adult human hand sizes.

In some implementations, the multipurpose rotatable handgrip 125 may be provided in various diameters with a substantially symmetrical shape about an axis of rotation. In some examples, a multipurpose rotatable handgrip may be sized and configured for gripping to suit various sizes of ratchet tie-down systems. For example, heavy-duty ratchet tie-down systems may employ a substantially enlarged symmetric multipurpose rotatable handgrip.

FIGS. 3A, 3B, 3C and 3D depict various perspective views of an exemplary multipurpose rotatable handgrip.

Figure 3A:
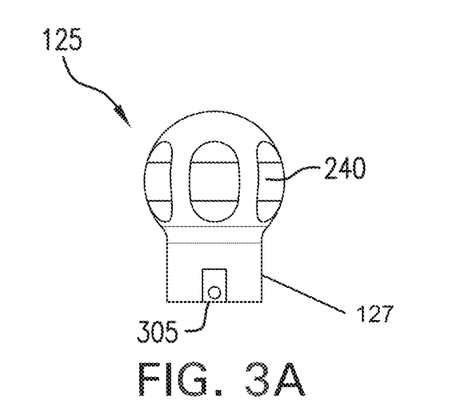
FIGS. 3A, 3B, 3C and 3D depict various perspective views of an exemplary multipurpose rotatable handgrip.

In FIG. 3A, the multipurpose rotatable handgrip 125 is depicted in a side view illustrating the grip feature 240. In the elevation view of FIG. 3A, the multipurpose rotatable handgrip 125 is illustrated as substantially symmetric about an axis of rotation and elliptical in shape. In the depicted example, the multipurpose rotatable handgrip 125 is a knob adapted for mounting by a securing tab 305, which is adapted to receive a radially oriented securing pin, such as, for example, the cotter pin 225 of FIG. 2A.

Figure 3B:
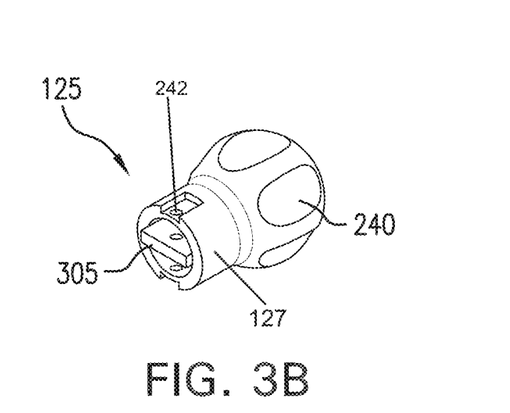

In FIG. 3B, the multipurpose rotatable handgrip 125 is depicted with the exemplary securing tab 305 configured to align with a securing aperture within the ratchet axle (ratchet axle 220 of FIG. 2A) and to be secured in place with one of the cotter pins 225 of FIG. 2A and FIG. 2B.

Figure 3C:
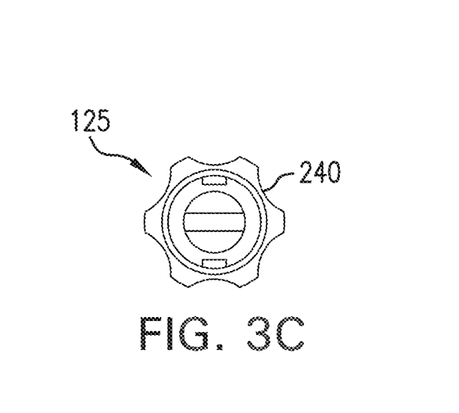

In FIG. 3C, a top view of the multipurpose rotatable handgrip 125 illustrates the full perimeter distribution of the exemplary grip feature 240.

Figure 3D:
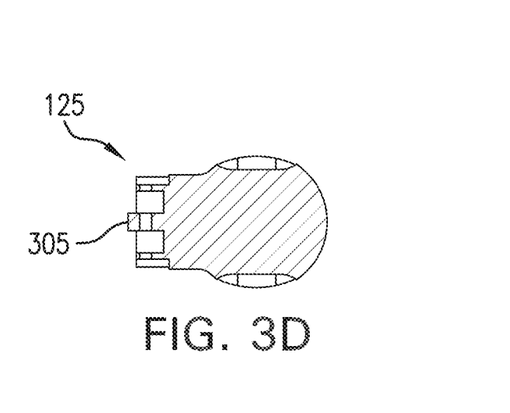

In FIG. 3D, a cross-sectional elevation view depicts construction of the multipurpose rotatable handgrip 125. In some embodiments, the multipurpose rotatable handgrip 125 may be permanently connected to the ratchet mechanism, which may advantageously prevent loss. For example, the multipurpose rotatable handgrip 125 may be integrally formed with, and/or formed of the same material as, for example, the ratchet axle 220 of FIG. 2A.

Figure 4:
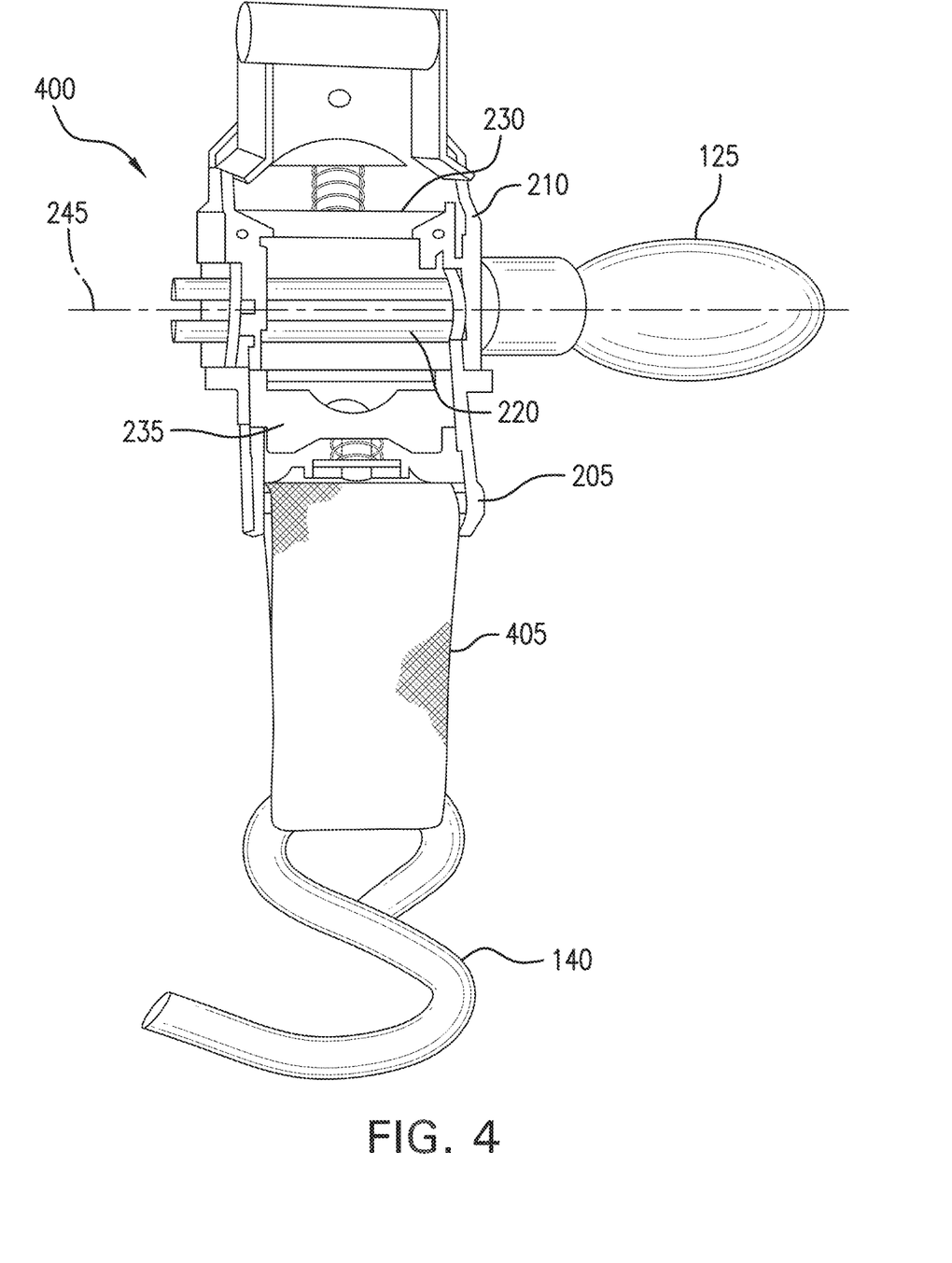
FIG. 4 depicts a plan view of an exemplary ratchet strap with the load securing strap removed.

FIG. 4 depicts a plan view of an exemplary ratchet strap with the load securing strap removed. A ratchet tie-down system 400 includes the ratchet handle retaining structure 210 hingedly coupled to the hook retaining structure 205, forming the hinge axis 245. In the illustrated embodiment, the ratchet tie-down system 400 is hinged open in a fully extended state. The ratchet tie-down system 400 includes the ratchet pawl 235. The ratchet tension release bar 230 is slideably retained by the ratchet handle retaining structure 210. In the fully extended state, the ratchet pawl 235 and the ratchet tension release bar 230 are pulled away from the ratchet teeth, allowing the multipurpose rotatable handgrip 125 to rotate the ratchet axle 220 freely in either direction.

In the depicted example, a proximate attachment strap 405 is retained by the hook retaining structure 205. The proximate attachment strap 405 linkably couples the hook retaining structure 205 to the proximal hook 140.

Figure 5:
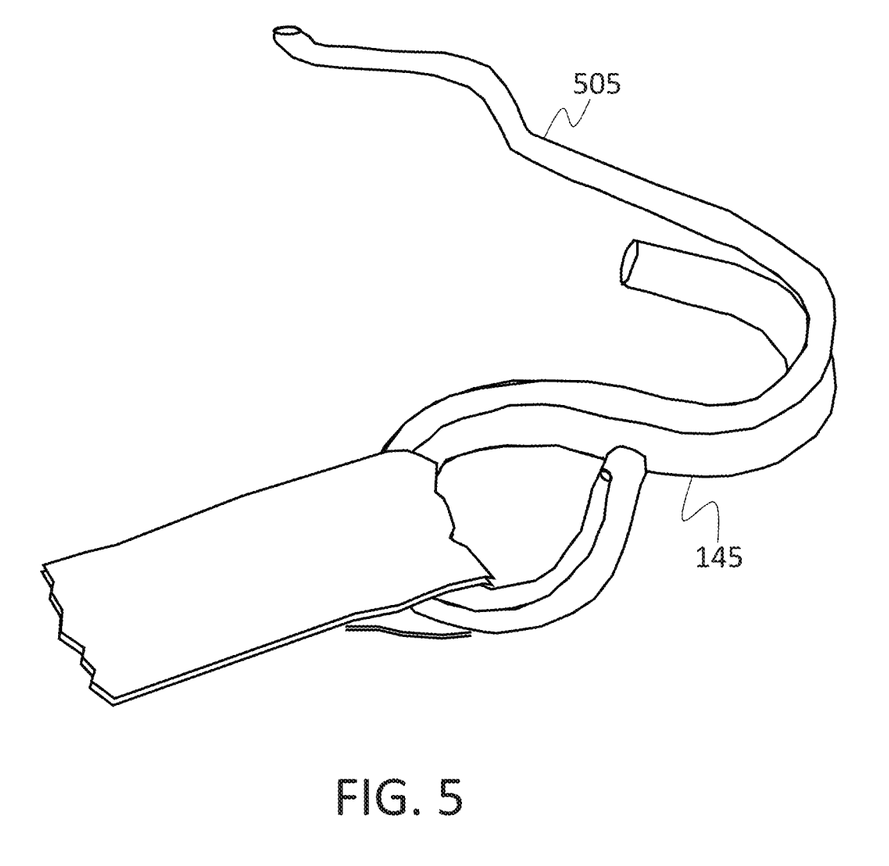
FIG. 5 depicts a perspective view of an exemplary coupled companion hook.

FIG. 5 depicts a perspective view of an exemplary coupled companion hook. In the depicted figure, the distal securing hook 145 includes a companion hook 505. The companion hook 505 is coupled to the distal securing hook 145 along part of its length. In some examples, the coupling may be about half of the overall length of the distal hook. The hooks 145 and 505 may be coupled by the rubberized coating. In some examples, the hooks 145 and 505 may be initially coupled by a binding wire wrapped around the two hooks 145 and 505, then a rubberized coating added to the two hooks 145 and 505. Further, the wrapping in conjunction with the rubber coating may for a substantially strong bond between the two hooks 145 and 505, and allow a free end of the companion hook 505 to be operable to assisting with positioning of the hook 145, holding it in place during deployment. In some examples, the hooks 145 and 505 may be fused into the same plane. In some embodiments, the hooks 145 and 505 may be fused along the strap linking radius. In some embodiments, the hooks 145 and 505 may be curved in opposite directions. In some examples, the depicted configuration of the companion hook 505 may be implemented on a proximal hook, such as, for example, the proximal hook 140 of FIG. 1A.

Figure 6:
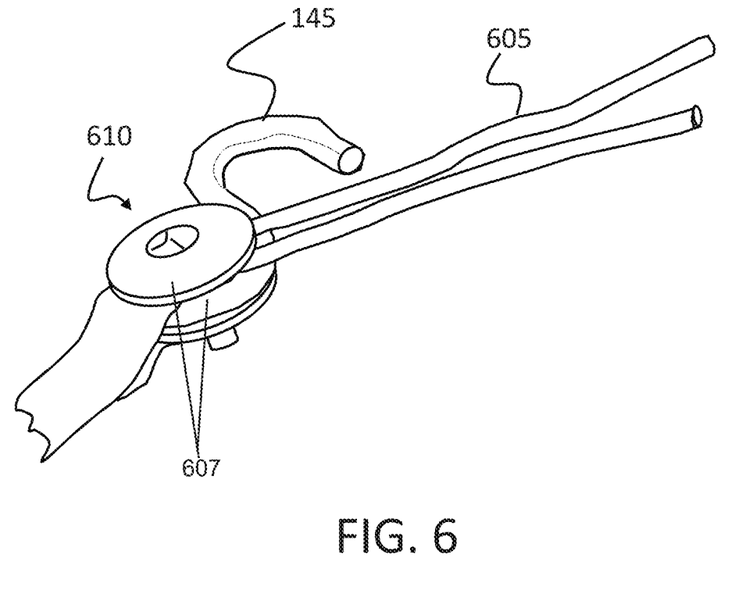
FIG. 6 depicts a perspective view of an exemplary coupled companion hook.

FIG. 6 depicts a perspective view of an exemplary coupled companion hook. The distal securing hook 145 includes a companion hook 605. The companion hook 605 is coupled to the distal securing hook 145 by a companion hook retaining system 610. In some examples, the companion hook retaining system 610 may be implemented as an attachment structure, such as fender washers 607 on each side of the strap retaining portion of the hook 145. Further, the fender washers 607 may be fastened with nut and bolt hardware, for example, to the hooks 145 and 605. In some embodiments, the companion hook 605 may be folded in half and wrapped around the fastening hardware, as depicted. In some embodiments, two or more companion hooks 605 may be employed. In some examples, as in FIG. 5, the depicted configuration of the companion hook 605 may be implemented on the proximal hook (FIG. 1A, reference 140).

Although various embodiments have been described with reference to the figures, other embodiments are possible. Various embodiments of ratchet strap designs in accordance with the present disclosure may provide an improved ratchet strap which places more control and jam-clearing capability safely into the hands of an operator. In some embodiments, ratchet strap devices, sometimes referred to as "tie-down straps," may use a ratchet mechanism to put tension on a strap anchored to two points. Some ratchets configured in ratchet straps may include clam-like levers and a ratchet centered around a strap-drive that is slotted to receive the passive strap. In various implementations, operation of the levers rotates the strap-drive, which may create tension on the strap. Further, a gear and pawl may prevent the strap-drive from moving in the opposite direction (unwinding). In some examples, to release the strap, the pawl may be disengaged and the strap tension may be released.

In some embodiments, the ratchet tie-down system may prevent load release due to handle "flip-open". Some examples may prevent abrupt disengagement, and may prevent quick release of balanced loads that may be held in that position by the straps. In some examples, the ratchet tie-down system may promote a controlled release of a load.

Further, a controlled release may advantageously avoid rebounding and tipping of loads, and avoid damage to the item and/or harm to the operator.

In some embodiments, the design may incorporate a strap-drive device that incorporates a ball that may comfortably fit the human hand. The ball may create a system of improved control for loading and unloading a ratchet tie-down system, and may secure the items being tied down. In various implementations, the hand-operated drive mechanism may significantly improve safety and efficiency of use.

In some examples, a two-piece strap-drive of a current ratchet tie-down system may be retrofitted with a ball integrated onto a shaft/axle that is slotted, (two-prong fork) to receive a load securing strap.

In some examples, the term "ball" may refer to a device coupled to the axle of the ratchet mechanism for direct control of the drive by the human hand. The ball may allow a user to more precisely and safely control the operation of the ratchet tie-down system. In various implementations, the ratchet mechanism within a ratchet tie-down system may include a rotating spool or axle which may be a machined or a cast metal two-prong fork that may integrate a ball, on one or both sides, configured in size to comfortably fit a human hand.

In some embodiments, the hand-driven ball device may facilitate operator control of the ratchet release mechanism and may prevent abrupt unexpected disengagement of the release mechanism. Thus, in this safe operation, the operator may control the strap release-tension with one hand using the hand-operated ball, while at the same time may trigger the strap release mechanism with the other hand.

An elastic loop may permit the user to neatly stow the strap by wrapping it around a body of the ratchet module and capture it with the elastic loop under tension. The elastic loop may promote a controlled wrap of the strap and therefore reduce the time and effort to unwrap and deploy a ratchet strap from the cached stowage state.

In some examples, the ratchet tie-down system may include a flexible companion hook 160 which has a bendable property and may support the weight of the ratchet tie-down system such that the distal securing hook may be temporarily secured using the flexible companion hook 160 while the user manages the proximal end.

In some examples, the washers included in the flexible companion hook retaining system may be configured with a sufficient (e.g., a predetermined minimum) space between, to permit the flexible companion hook to rotate about the eyelet of the distal securing hook 145.

In some examples, the detachable strap, the flexible companion hook, the distal securing hook 145 along with the flexible companion hook retaining system may be referred to as a "load securing strap". In some implementations, the flexible companion hook 160 may facilitate remote securing of the distal securing hook to the target object, for example, by deforming to wrap around a portion of the strap, such as when the load securing strap may be wrapped around the object (e.g., tree, fence post, structural beam).

In an exemplary use case configuration, with the excess length of the load securing strap retained by an elastic loop in a bundle coiled around the knob, a user may employ the ratchet tie-down system to secure a load. As the load is cinched (tightened) to a vehicle there may be a resulting excess length of the load securing strap. In some examples, the excess length may be referred to as a tail-end. To facilitate safe deployment of the ratchet tie-down system this excess length may advantageously be wound around the multipurpose rotatable handgrip. The excess length of the strap may be coiled in bundle around the multipurpose rotatable handgrip. The bundle may be secured with an elastic loop. The elastic loop may be coupled to the ratchet handle retaining structure by a retaining loop attachment apertures.

In some embodiments, a short strap may be linkably coupled to the ratchet handle retaining structure. The short strap may be coupled to a distal securing hook.

In some embodiments, a ratchet tie-down system may be neatly stowed. The unused strap bundle may be secured around the ratchet tie-down system with an integral elastic loop. In some examples, the elastic loop may be secured to retaining loop attachment apertures within the ratchet mechanism.

In various examples, a user may place the load securing strap through the backside of the ratchet mechanism, then feed it through the axle. Further the user may then place a thumb on the strap within the axle, roll it over with the multipurpose rotatable handgrip and then pull the tail-end straight out. In some examples, the multipurpose rotatable handgrip may provide a straight-forward method to apply pretension on the strap. In this example, the user may pull on the ratchet mechanism until the proximal hook is tight, then reel in the load securing strap with the multipurpose rotatable handgrip until it is hand tight. The user may then ratchet the mechanism using the ratchet lever. The user may beneficially keep the entire deployment mechanism together and in place. To remove the ratchet tie-down system, the user may release the pawl with one hand, holding the multipurpose rotatable handgrip in the other hand. The user may, in this example, facilitate rolling the axle backward, and pull the strap back out. The user may advantageously remove the strap even if the ratchet mechanism is clogged or jammed, and may advantageously take tension out of the load in a controlled manner, for example, in the case where a strap was to rebound or recoil.

Various examples may provide one or more advantages. For example, the knob may be configured with indentions to facilitate grip. Some embodiments may be configured with a bendable hook to temporarily secure a strap end. In some embodiments, the bendable hook may be adapted to swivel about a coupling point (e.g., rivet). The proximal end of the bendable hook may be fixedly coupled to, for example, an eyelet. Various embodiments may be configured with an elastic loop sized to retain the strap when in-transit or in-storage.

In some embodiments, the multipurpose rotatable handgrip may include a centrally located radial aperture. In such embodiments, the user may insert a screwdriver to gain a leverage advantage.

Apparatus and associated methods relate to a ratchet tie-down system configured with a multipurpose rotatable handgrip adapted to a human hand, an elastic retaining loop and a bendable companion hook. In an illustrative example, an operator may find benefit in deployment time of a ratchet tie-down system by employing the multipurpose rotatable handgrip to facilitate initial winding of a load securing strap. In some implementations, operators may employ the multipurpose rotatable handgrip as a convenient location to wind excess strap length, in conjunction with the elastic retaining loop for in-transit stowage. In various examples, owners may find advantage in the cache stowage feature of the ratchet tie-down system where the straps may be wound around the ratchet mechanism and retained in place by the elastic loop.

In some implementations, a kit may include a set of one or more ratchet modules equipped with at least an equal number of handgrips for manually manipulating the ratcheting operations, and specifically the drive axle, in certain operating modes in, for example, the manners described herein. The kit may include the assisting distal hook finger member, and/or elastic loops that may optionally be secured to the ratchet module body. The kit may include paper, audio, and/or video instructions for loading, unloading, pre-tensioning, detensioning, and clearing jams using the access and control provided by the handgrip in accordance with various embodiments described herein. The instructions in the kit may further include a description of how to retrofit a conventional ratchet mechanism to upgrade it with the handgrip, how to upgrade the distal hook to include the assistance of a deformable finger member as described, and/or instructions for upgrading to include an elastic loop that may be secured to the webbing or the housing to provide the conveniences of the elastic loop as described herein.

In some examples, the kit may include accessories and parts for retrofitting a distal hook and strap to include a deformable finger, such as with fender washers and associated components as described. Some kits may include components and instructions for installing the elastic loop accessory in a retrofit kit.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are contemplated, within the scope of the following claims.

What is claimed is:

1. A ratcheted strap control system comprising:
   a length of webbing having a free proximal end and a hook coupled to a distal end;
   a ratchet module configured to spool the length of a webbing with a ratcheting action, the ratchet module comprising:
      a first base structure having a first annular ring portion about a hinge axis and with a first radius over a first predetermined range of angles, and a step portion having a second radius greater than the first radius, and a notch at an end of travel angular position and defining a third radius between the first radius and the second radius;
      a second base structure having a second annular ring portion about the hinge axis and with a cam portion;
      an axle extending along and configured to rotate about the hinge axis and to couple the first base structure to the second base structure in a hinged relationship between a closed position and an open position, wherein the axle defines an aperture configured to receive and retain the free end of the webbing in a spooling relationship, and wherein the axle is configured to spool in the webbing in response to the axle rotating in an opening direction;
      a ratchet wheel coupled in a fixed rotating relationship with the axle about the hinge axis, the ratchet wheel providing a plurality of ratchet teeth radially extending from a perimeter of the ratchet wheel;
      a ratchet pawl slidably carried in a slot formed in the first base structure, the pawl configured in a releasable blocking relationship with the plurality of ratchet teeth against rotation in a closing direction;
      a ratchet bar slidably carried in a slot formed in the second base structure, the ratchet bar configured in a biased relationship to dynamically engage any one of the plurality of ratchet teeth; and,
      an elastic loop portion coupled to the first base structure, the elastic loop portion sized to securely retain a predetermined length of the webbing when wrapped around the first base structure and the second base structure in a closed position.

2. The ratcheted strap control system of claim 1, wherein the elastic loop portion is sized to a diameter that, when in a stretched state, is adapted to securely retain the predetermined length of the webbing when wrapped around the first and second base structures in the closed position.

3. The ratcheted strap control system of claim 1, further comprising an axially symmetric handgrip configured to couple in a fixed rotational relationship to the axle, wherein:
   (1) in a first mode of operation that occurs over the first predetermined range of angles between the first base structure and the second base structure, the pawl engages the ratchet wheel to block rotation of the ratchet wheel in the closing direction, and the ratchet bar is configured to impart rotation to the axle as the ratchet bar rotates in the opening direction;
   (2) in a second mode of operation, the ratchet bar disengages from the ratchet wheel in response to engagement with the step portion such that the handgrip is operable to impart rotation to the axle in the opening direction in response to operator input while the ratchet pawl blocks rotation of the axle in the closing direction; and,
   (3) in a third mode of operation, the pawl disengages from the ratchet wheel in response to being displaced by the cam portion when the ratchet bar is positioned in the notch, such that the handgrip is operable to impart rotation to the axle in the opening direction and the closing direction in response to operator input.

4. The ratcheted strap control system of claim 3, wherein the elastic loop portion is sized to a diameter that, when in a neutral state, encompasses an area less than a cross-sectional area of the handgrip when wrapped by a predetermined length of the webbing.

5. The ratcheted strap control system of claim 3, wherein the handgrip further comprises a neck portion and a substantially spherical bulbous portion.

6. The ratcheted strap control system of claim 5, wherein the handgrip further comprises a pair of apertures on opposing sides of the neck portion and configured to releasably couple to the axle.

7. The ratcheted strap control system of claim 6, wherein the axle comprises corresponding apertures that, when aligned with the pair of apertures in the handgrip, are adapted to receive a coupling member that couples the handgrip in the fixed rotational relationship with the axle.

8. The ratcheted strap control system of claim 3, wherein the handgrip further defines an axially symmetric profile sized for a secure grip by a hand of an adult operator.

9. The ratcheted strap control system of claim 3, wherein the handgrip is adapted to releasably couple to the axle.

10. The ratcheted strap control system of claim 3, further comprising a compliant, deformable, shape resilient member coupled to a distal end of the webbing and adapted to cooperate with the hook to maintain the hook in engagement with an attachment structure while the operator is remote from the hook and while the webbing is slack.

11. An apparatus comprising:
    a ratchet module configured to spool a length of a webbing with a ratcheting action, the ratchet module comprising:

a first base structure having a first annular ring portion about a hinge axis and with a first radius over a first predetermined range of angles, and a step portion having a second radius greater than the first radius, and a notch at an end of travel angular position and defining a third radius between the first radius and the second radius;

a second base structure having a second annular ring portion about the hinge axis and with a cam portion;

an axle extending along and configured to rotate about the hinge axis and to couple the first base structure to the second base structure in a hinged relationship between a closed position and an open position, wherein the axle defines an aperture configured to receive and retain a free end of a strap in a spooling relationship, and wherein the axle is configured to spool in the strap in response to the axle rotating in an opening direction;

a ratchet wheel coupled in a fixed rotating relationship with the axle about the hinge axis, the ratchet wheel providing a plurality of ratchet teeth radially extending from a perimeter of the ratchet wheel;

a ratchet pawl slidably carried in a slot formed in the first base structure, the pawl configured in a releasable blocking relationship with the plurality of ratchet teeth against rotation in a closing direction;

a ratchet bar slidably carried in a slot formed in the second base structure, the ratchet bar configured in a biased relationship to dynamically engage any one of the plurality of ratchet teeth; and, a retainer comprising an elastic loop portion and a proximal attachment strap coupled to the first base structure, the elastic loop portion sized to securely retain a predetermined length of webbing when wrapped around the first base structure and the second base structure in a closed position.

12. The apparatus of claim 11, further comprising an axially symmetric handgrip configured to couple in a fixed rotational relationship to the axle, wherein:

(1) in a first mode of operation that occurs over the first predetermined range of angles between the first base structure and the second base structure, the pawl engages the ratchet wheel to block rotation of the ratchet wheel in the closing direction, and the ratchet bar is configured to impart rotation to the axle as the ratchet bar rotates in the opening direction;

(2) in a second mode of operation, the ratchet bar disengages from the ratchet wheel in response to engagement with the step portion such that the handgrip is operable to impart rotation to the axle in the opening direction in response to operator input while the ratchet pawl blocks rotation of the axle in the closing direction; and, (3) in a third mode of operation, the pawl disengages from the ratchet wheel in response to being displaced by the cam portion when the ratchet bar is positioned in the notch, such that the handgrip is operable to impart rotation to the axle in the opening direction and the closing direction in response to operator input.

13. The apparatus of claim 11, further comprising a hook coupled to a distal end of the length of a webbing and a compliant, deformable, shape resilient member adapted to cooperate with the hook to maintain the hook in engagement with an attachment structure while an operator is remote from the hook and while the webbing is slack.

14. The apparatus of claim 12, wherein the elastic loop portion is sized to retain an excess length of the webbing coiled around the rotatable handgrip.

15. The apparatus of claim 13, wherein the elastic loop portion is adapted to retain the length of the webbing, the hook, and the compliant, deformable shape resilient member coiled around the rotatable handgrip when the first and second base structures are in a closed position.

16. The apparatus of claim 12, wherein the elastic loop portion is sized to a diameter that, when in a stretched state, is adapted to securely retain the predetermined length of the strap when wrapped around the first and second base structures in the closed position.

17. The apparatus of claim 12, wherein the elastic loop sized to a diameter that, when in a neutral state, encompasses an area less than a cross-sectional area of the handgrip when wrapped by a predetermined length of the strap.

18. The apparatus of claim 11, wherein the proximal attachment strap is securely attached to one of the first and second base structures.

* * * * *